United States Patent
Goldberger

[15] 3,637,437
[45] Jan. 25, 1972

[54] RANEY METAL SHEET MATERIAL

[72] Inventor: Max Goldberger, Wapping, Conn.
[73] Assignee: Catalytic Technology Corporation, Manchester, Conn.
[22] Filed: June 3, 1970
[21] Appl. No.: 43,220

Related U.S. Application Data

[63] Continuation-in-part of Ser. No. 447,551, Apr. 12, 1965, Continuation-in-part of Ser. No. 408,217, Nov. 2, 1964, abandoned, Continuation-in-part of Ser. No. 761,880, Sept. 23, 1968.

[52] U.S. Cl. ..........................136/120 FC, 136/20, 136/28, 136/86 D, 29/192
[51] Int. Cl. ......................................................H01m 13/06
[58] Field of Search..........................136/120, 86, 20, 28, 29; 117/105, 105.1, 105.2, 22, 131; 29/192

[56] References Cited

UNITED STATES PATENTS 3,231,429  1/1966  Jung et al..........................136/120 FC

*Primary Examiner*—Winston A. Douglas
*Assistant Examiner*—C. F. Lefevour
*Attorney*—Rosen & Steinhilper

[57] ABSTRACT

A Raney metal catalytic sheet material is prepared by spraying molten particles of a Raney alloy, such as a silver, nickel, iron, platinum or cobalt alloy with aluminum on a substrate, and leaching aluminum from the alloy. The sheet catalyst is claimed as is the process of manufacture.

10 Claims, No Drawings

RANEY METAL SHEET MATERIAL

The present invention relates to preparation of catalytic metals and more particularly to the preparation of porous Raney metals in porous sheet and plate form. This application is a continuation-in-part of my application Ser. No. 447,551 which was filed Apr. 12, 1965 which in turn is a continuation-in-part of my application Ser. No. 408,217, filed Nov. 2, 1964, now abandoned; and a continuation-in-part of my application Ser. No. 761,880, filed Sept. 23, 1968, all of which are incorporated herein by reference.

Raney metals and particularly Raney silver, Raney nickel and Raney cobalt are known to exhibit high-chemical activity resulting in extensive use as catalysts. These materials have also been considered for use as electrodes in fuel cells. Raney metals have commonly been used in organic reactions in the form of finely divided pyrophoric powders. Such materials have no mechanical strength and are not useful as electrodes. Attempts have been made to prepare Raney metals in sheet plate form by pressing and sintering a mixture of the Raney metal with another metal powder such as nickel, as described in U.S. Pat. No. 3,126,273. Such pressing and sintering processes involve the use of complicated molds and result in preparation of highly stressed material. As a consequence, it has not been proven possible to prepare electrodes of a diameter greater than about 2 inches, without obtaining cracked material.

It is an object of the present invention to provide novel porous Raney metal sheet materials. It is also an object of the present invention to provide porous self-supporting sheets of Raney metal which are suitable for use as gas diffusion electrodes. It is a further object of this invention to provide supported sheets of porous Raney metal which are suitable for use as electrodes in fuel cells, in batteries, and in propulsion devices. The invention also contemplates providing methods for producing porous Raney metal sheet materials.

The present invention provides porous Raney metal sheet material that may be manufactured in a variety of forms, shapes and sizes. The size of the sheet or plate is dictated by the intended use. These sheets and plates are formed by spraying a Raney alloy on a substrate and then leaching aluminum from the alloy. The Raney metals are silver, nickel, cobalt, iron and platinum. Alloys of these metals with aluminum in he amounts specified in the succeeding paragraph, are termed "Raney alloys" herein. The active metal resulting from the leaching of aluminum from a Raney alloy is termed "Raney metal" herein.

The term "Raney metal" is used herein, and in the claims, and it is to be understood that the term denotes a catalyst metal having a metal defect structure whereby a tremendous active catalyst area is produced. The usual method of creating a Raney metal catalyst is by leaching aluminum out of an alloy, but it is to be understood that the term Raney metal as applied to a product may include metal defect structures differently prepared.

In the metal spraying process, heated particles of metal are impinged upon a substrate. The particles are heated to above the melting point of the Raney alloy utilized. The nickel-aluminum alloys containing from about 45 to 55 percent nickel and 55 to 45 percent aluminum melt at temperatures between about 1,100° C. and 1,300° C. The iron-aluminum alloys containing about 45 to 55 percent iron and 55 to 45 percent aluminum melt at between about 1,150° C. and 1,200° C. Cobalt-aluminum alloys containing about 45 to 55 percent cobalt and about 55 to 45 percent aluminum melt at between about 1,100° C. and 1,250° C. Silver-aluminum alloys containing from about 50 percent to 80 percent silver and 50 percent to 20 percent aluminum melt at between about 600° C. and 700° C. Platinum-aluminum alloys containing from about 45 percent to 65 percent platinum and 55 to 35 percent aluminum melt at between about 900° C. to about 1,100° C.

It is generally preferred to use the higher melting Raney alloys such as the nickel-aluminum or cobalt-aluminum in the form of metal powder as feed to the spray gun. The powder is melted more quickly with less opportunity for oxidation and burning of the lower melting aluminum constituent. Low-melting Raney alloys such as the silver-aluminum alloys are preferably used in the form of rods as feed to the spray gun. The temperature to which the Raney alloy is brought in the spray gun should be above its melting point. It the not be superheated to the point where the alloy characteristics are destroyed. The preferred temperatures are influenced by the product desired. A higher temperature giving the molten particle a great degree of fluidity results in a denser, less porous metal coating. With the use of lower temperatures, the interior of the particle may not be entirely molten, or although molten, the total heat content of the particle may not be sufficient to to retain a sufficiently large portion of the metal molten when it is impinged on the substrate. Such particles bond to each other to produce porous sheet, in part retaining the particle characteristics from which it was formed.

The distance between the nozzle of the spray gun and the substrate also influences the product characteristics. The closer the nozzle is to the substrate, the less chance there is for cooling before impingement, and the denser is the resultant coating. As the distance is increased, the coating becomes increasingly porous. Ultimately, a point is reached at which the particles are sufficiently cooled in the air so that the resultant sheet has little mechanical strength. Where it is desired to obtain a thin sheet of porous Raney metal on a permanent substrate, it is preferable to start spraying relatively close to the substrate to obtain a denser coating with better bonding to the substrate. The nozzle is then moved further from the sheet to obtain a more porous coating. This is exemplified in the production of a Raney nickel sheet about 0.1 millimeter thick on a nickel foil substrate, using a plasma-type spray gun and a Raney alloy powder feed. When using an Avco metal powder spray gun, the temperature of the sprayed matter particles is about 1,300° to 1,400° C. This temperature has not been definitively determined. The gun is initially held about 5 inches from the nickel foil and a very thin coating produced. The nozzle is then moved back to about 10 inches from the foil to build up a porous sheet about 0.1 mm. thick.

The degree of porosity of the product is also influenced by the size of the sprayed particles. This, in turn, is governed by the design of the spray equipment, the heat source, the feed, etc. The porosity is porosity influenced by the size of the metal powder granule feed. The leached products of this invention have a microporosity resultant from the leaching of aluminum. They preferably also have a macroporosity resultant from the porous Raney alloy product of the spray process.

The substrate utilized is also dependent upon the Raney alloy worked, and the desired product characteristics. The substrate may be one which is permanently bonded to and forming a support fro the product Raney metal sheet. Such substrates are preferably metallic and selected to give optimum physical and mechanical characteristics. Nickel is the preferred substrate for supported Raney nickel sheets. Copper is the preferred substrate for supported Raney silver sheets. Such substrates as cast iron, stainless steel, aluminum, etc., may be used. The metal substrate may be a solid sheet or it may be a porous or mesh material. Where a permanent bond is desired, the metal substrate should be cleaned prior to coating. The substrate may also be one which is to be removed so that the resultant Raney metal product will be self-supporting. Such sheets may be porous and suitable for use as a gas diffusion electrode. For such purposes, paper, cloth, high-melting plastics, asbestos, etc., are suitable, dependent upon the Raney alloy being sprayed. Paper is suitable as a substrate for a sprayed Raney silver-aluminum alloy, whereas the hotter sprayed Raney nickel-aluminum alloy preferably is sprayed upon asbestos or a foraminous refractory support. Metal subcent to 65 percent platinum and 55 to 35 percent aluminum 70 strates may also be removed from the Raney alloy sheet or Raney metal sheet by chemical or physical means, and a porous, metal supported sheet catalyst can be made with a fine-mesh metal screen as a support sheet. It is possible to mechanically separate the substrate and Raney alloy or metal sheet by cutting. It is also possible to spray a Raney alloy on a metal substrate having a thin coherent oxide coating, e.g., aluminum having a light oxide film, to produce a coated substrate which, upon cooling of the sprayed Raney alloy, separates, i.e., the Raney alloy sheet simply "pops" from the aluminum substrate.

The Raney alloy sheet products of the spraying process, preferably while still on the substrate, are leached in aqueous alkaline solutions to remove aluminum. The preferred solutions are dilute aqueous solutions of sodium or potassium hydroxide. Aluminum reacts with the aqueous caustic solution, resulting in the formation of hydrogen. If hot or concentrated solutions are used, reaction proceeds very rapidly with the immediate evolution of large quantities of hydrogen. This destroys the desired mechanical structure of the product. To prevent this occurrence, the leaching is instituted in relatively cool and dilute aqueous caustic solutions, i.e., initial room temperature leaching with solutions containing up to about 5 percent sodium hydroxide or potassium hydroxide. When hydrogen evolution ceases, the temperature is increased stepwise to a maximum of about 80° C. It is known that it is not possible to leach all the aluminum from Raney alloys. Thus, the Raney metals resultant from the leaching of Raney alloys often contain up to about 5 percent of residual aluminum. The amount of aluminum in the Raney alloy desired, or permitted, is determined by the service contemplated. The leaching sequence utilizing 5 percent sodium hydroxide to a maximum temperature of 80° C., provides Raney nickel, Raney cobalt, Raney silver and other Raney metals electrodes suitable for use as gas diffusion electrodes in fuel cells with a relatively dilute aqueous alkaline electrolyte. Electrodes for use in nickel storage cells operating with an electrolyte containing 35 percent potassium hydroxide are subjected to an additional rigorous leach in which the final leaching step is carried out under conditions more rigorous than the service contemplated. The use of an initial low-temperature dilute aqueous alkaline leach, followed by increasing temperature, and, when the product requires it, followed by a more rigorous leach in concentrated solution, results in a slow leaching of aluminum. This is controlled to be sufficiently slow so that large scale hydrogen evolution sufficient to destroy the sheet structure is avoided.

The Raney metal sheets after leaching are highly pyrophoric. Within a relatively short time, e.g., 5 to 30 seconds, of contact with air, the surface rapidly oxidizes with evolution of a great deal of heat. The degree of pyrophoric activity varies with the particular Raney metal, the percentage porosity, etc. The Raney metal sheets may be stored in an inert atmosphere or in liquids which permit little or no oxygen to reach the metal. It has been discovered that a nonpyrophoric Raney metal sheet may be prepared by immersion in oxygen-containing water for several days, e.g., 2 to 3 days. Sufficient oxygen is supplied to the water by continuous aeration, such as commonly employed in fish tanks. The preparation of the nonpyrophoric material is preferably carried out by adding a small amount of hydrogen peroxide, e.g., 0.03 percent by weight, to the water. It is preferred that the hydrogen peroxide should be added some time after the Raney metal is immersed in the liquid, e.g., one-half day later. The resultant nonpyrophoric Raney metal may be stored and handled in air. Although the surface is slightly oxidized, it is suitable for use in most applications. Thus, a Raney nickel electrode treated accordingly may be used as the anode in a Raney nickel-Raney nickel oxide cell. The initial charging will reduce any oxide film that may have formed during the immersion treatment. The foregoing treatment provides a product adapted to commercial manufacture, distribution and storage techniques. The treated nonpyrophoric Raney silver has been found to have modified chemical characteristics, e.g., it is insoluble in phosphoric acid. For certain purposes, as e.g., with the use of Raney cobalt sheets for propulsion, the nonpyrophoric treatment may be abridged or omitted.

As noted, the Raney silver-aluminum alloys may contain from about 50 to 80 percent silver. Below 50 percent silver, the silver particles become separated and the mechanical strength of the Raney silver becomes marginal. Raney silver sheet material having as little as 50 percent silver may be prepared on a supporting substrate. For use as self-sheet upon removal of the substrate, it is preferred that the silver content be higher. Above 80 percent silver, it becomes very difficult to leach the aluminum component. Raney silver-aluminum alloys used for the manufacture of electrode preferably contain from about 65 to 75 percent silver. I presently prefer alloys of 70 percent silver and 30 percent aluminum for the manufacture of electrodes. The Raney silver-aluminum alloy feed to the spray gun should be in the form of an alloy, rather than material containing segregated silver and segregated aluminum in the desired proportion. It is preferred that the Raney silver-aluminum alloy feed be in the form of a rod. Surprisingly, it has been found that rods cast from a melt containing 70-30 silver-aluminum and quickly chilled are unsuitable. Suitable rods are prepared from an alloy prepared by bringing aluminum to 700° C. adding silver while heating and agitating to between about 1,100° C. and 1,200° C., preferably 1,140° C., and then casting into hot dies (about 300° C., and allowing the cast rods to air cool at room temperature).

The Raney alloys contemplated from preparing the Raney metal sheets are those having the compositions specified hereinbefore. It has also been discovered that diluent materials may be added from specified purposes without adversely affecting the product characteristics. Certain diluents may be desirable to improve specified product characteristics. As a general rule, such diluent materials will reduce the catalystic activity of the resultant Raney metal sheet. They will usually be selected to increase the mechanical strength of the sheet and/or to reduce the cost by substituting an inexpensive diluent, e.g., up to about 5 or 10 percent copper, for silver. Porous Raney nickel electrodes may be prepared using an admixture of finely powdered nickel, e.g., carbonyl nickel, with the Raney nickel-aluminum powder feed. The use of carbonyl nickel in amounts up to about 70 percent and preferably between about 30 and 50, of the total of carbonyl nickel and Raney nickel-aluminum alloy, have proven useful in preparing strong porous electrodes. Although the Raney nickel-aluminum alloy may be diluted with nickel, the Raney nickel-aluminum alloy composition should be maintained at a preferred ratio of 50:50, plus or minus 5, and preferably not varying from the preferred ratio by more than about 3 percent.

The Raney metal sheet products of this invention are continuous coherent porous sheet materials in self-supporting form, or on a substrate. Unsupported sheet material, and sheet material on a substrate which can be removed from the substrate in a self-supporting form, are preferred. Entire sheets may be obtained as a self-supporting whole, or parts of the sheet may be obtained, each of which is self-supporting. The term "self-supporting sheet" is used to denote such sheets or sections thereof even relatively small sections, as distinguished from the usual powdered form in which the Raney metals have been prepared. Those sheets sprayed under conditions to produce a sheet having a coarse macroporous structure consisting of a continuous layer of irregular, highly subdivided particles bonded together are preferred. The activity of the preferred Raney metal sheets of this invention is attributed to the large surface area resulting from the macroporosity and the microporosity, and to the defects in the lattice structure resultant from the removal of aluminum. The term "sheet" is used herein to include thin material, e.g., 0.1 mm. thick and usually supported on a substrate, and also relatively thick platelike material, e.g., several millimeters or more thick. For use as supported electrodes, Raney metal thicknesses of between about 0.1 mm. and 1.5 mm. are preferred. For use as a porous electrode, Raney metal thicknesses between about 0.5 mm. and 2 mm. are preferred. Above about 2 to 3 millimeters, it is difficult to leach out sufficient aluminum to achieve a porous structure. However, thicker sheets of Raney alloy leached in the surface portion to Raney metal are contemplated for specific uses. For use as cathode electrodes in fuel cells, composite electrodes having a baseplate of relatively inexpensive but strong material such as copper, stainless steel, etc., are useful. On the base material, an active thin layer of Raney metal is deposited and bonded thereto. The layer retains the activity of the Raney metal powders, due to the exposure of large surface area caused by the structural defects. However, since the layer is bonded to the base, mechanical strength is provided by the base layer. The layer may be thin, providing the desired reactive surface area with minimum volume of expensive material. Because of the strength of such electrodes they can be manufactured in large sizes to provide the capacity needed in fuel cells used for the generation of electric power in an economic manner. It is feasible to construct electrodes having extremely large surfaces, as e.g., in the range of 10 to 20 square feet with complete control over both mechanical and chemical factors.

The supported Raney cobalt sheets, or cobalt metal defect structure electrodes are particularly useful for the decomposition of organic fuels such as, e.g., the decomposition of hydrazine as disclosed in application Ser. No. 761,880.

Further details of the invention are apparent from the following illustrative examples. All percentages noted are by weight.

An electrode having a Raney nickel surface was prepared from a 50–50 mixture of nickel and aluminum. A commercial alloy in granular form was used as the feed to an Avco plasma dynamic spray gun. A nickel foil substrate 10 cm. by 10 cm. by 0.5 mm. thick was sprayed on the molten alloy from a distance of 5 inches until the entire surface had an extremely thin coating. The nozzle of the gun was then moved back to 10 inches from the substrate and spraying continued until a surface sheet 0.5 mm. thick was built up. This procedure was then repeated on the uncoated opposite side of the nickel foil substrate. The spray gun was a plasma dynamic gun. The coated material was then inserted into a 5 percent sodium hydroxide solution in water (50 grams of sodium hydroxide in 1 liter of water) at room temperature. Hydrogen was evolved. When hydrogen evolution stopped, the temperature was raised to 50° C. As the temperature was raised, hydrogen again was evolved. When hydrogen stopped coming off, the temperature was again raised to 80° C. until hydrogen evolution stopped. The coated sheet material is to be used as an electrode in a Raney nickel-Raney nickel-oxide battery having a 35 percent potassium hydroxide electrolyte. To produce an electrode which did not contain soluble aluminum under these conditions, the leached Raney nickel electrode was inserted into a concentrated aqueous leach solution of 35 percent potassium hydroxide at a temperature of 90° C. and held until hydrogen evolution stopped. The porous Raney nickel electrode produced was then immersed for 3 days in a tank containing water through which air was continuously bubbled. After one-half a day, 0.03 percent of hydrogen peroxide was added to the water. At the end of this period, the Raney nickel electrode was removed from the water and found to be stable, i.e., nonpyrophoric, in air. Examination of each surface of the electrode indicated a coarsely porous surface resultant from the spray process. Microscopic examination disclosed a continuous coherent material composed of small particles bonded together. It was possible to scrape off portions of the porous Raney nickel from the nickel foil with a sharp knife to produce pieces of self-supporting porous Raney nickel.

In a varient of the procedure described in the foregoing paragraph, an aluminum substrate having a thin oxide coating was used in place of the nickel foil. The oxide-coated surface was sprayed with a 50–50 nickel-aluminum alloy under the conditions noted in the preceding paragraph, to a thickness of 1.5 mm. The coated aluminum sheet was then allowed to cool to room temperature. As it cooled, the Raney nickel-aluminum sheet "popped" free of the substrate. This sheet was then leached in the 5 percent sodium hydroxide solution as aforesaid to a temperature of 80° C. The resultant porous Raney nickel sheet was 7 by 7 cm. and 1.5 mm. thick. Similar porous discs 60 cm. in diameter and 1.5 mm. thick have been prepared.

In accordance with another embodiment of the invention, a coherent, solid, porous Raney cobalt catalyst is formed. To form the catalytic surface, Raney cobalt powder consisting of 50 percent aluminum, 50 percent cobalt, available commercially from W. R. Grace Corporation, Baltimore, Md., as No. 2713, 50—50 aluminum-cobalt nonactive powder, is used as the feed to an Avco plasma dynamic spray gun. An open mesh metallic screen or foraminous substrate is sprayed with the spray gun which at least partially melts the alloy powder during a spraying process from a distance of 5 inches until the entire surface is built up with a thin coating. The nozzle of the gun is then moved back to approximately 10 inches and spraying continued until a surface sheet 0.5 mm. thick is built up. This process is repeated on the uncoated side of the screen. The coated screen is then immersed in a 5 percent sodium hydroxide solution in water (50 grams of sodium hydroxide in 1 liter of water) at room temperature. Hydrogen evolves as the aluminum component is leached from the alloy. When hydrogen evolution stops, the temperature is raised in small steps and held until further hydrogen evolution stops. The final temperature employed is approximately 80° C. Not all the aluminum need be leached out.

In another varient of the procedure, a very thin layer of molybdenum was sprayed from an Avco rod gun on a metallic substrate, e.g., nickel, or stainless steel, to a thickness just sufficient to cover the substrate. The Raney nickel-aluminum alloy was then sprayed from an Avco metal powder gun is accordance with the aforedescribed procedure. The use of the very thin intermediate molybdenum layer appears to enhance the bond resulting in a composite supported Raney metal sheet having greater mechanical strength. This procedure has also been successfully applied to the coating of substrates with a Raney silver-aluminum alloy.

Porous Raney iron sheet material is prepared in accordance with this invention in a manner similar to that described for the preparation of the porous Raney nickel sheet material.

A porous Raney silver electrode approximately 1 inch by 1 inch by 0.6 mm. thick was prepared by spraying a 70–30 silver-aluminum alloy on paper to a thickness of 0.6 mm. A conventional spray flame (hydrogen-oxygen) gun (Avco metal rod gun) was used with a rod feed. The rod has been prepared by melting aluminum at 700° C., raising the temperature to about 1,140° C. and adding silver. The molten alloy was then cast into dies preheated to 300° C., and allowed to cool in air. The alloy was sprayed on the paper from a distance of about 10 inches to produce a porous sheet. When the desired thickness had been achieved, spraying was discontinued and the material allowed to cool. The paper was stripped from the sheet and then sheet material immersed in a 5 percent sodium hydroxide solution to leach aluminum. The temperature was raised in stages to about 80° C. in accordance with the aforedescribed procedure. When the evolution of hydrogen stopped in about 3 days, the porous Raney sliver sheet suitable for use as an electrode was obtained. A small piece of the Raney silver-aluminum alloy was removed from the sheet material prior to the leaching process. A 1 gram sample was taken from this and accurately weighed. The aluminum content was known. The 1 gram sample was then leached following the same procedure as the sheet. It was then weighed and placed in a vacuum to extract leach liquor remaining in the pores and again weighed. For this information, the volume of leach liquor was determined and the percent porosity calculated to be 52 percent. It is believed that this represents primarily the macroporosity of the sheet. It is not believed that the leach liquor could have infiltrated the very small spaces occupied by much of the aluminum leached from the lattice structure.

A supported Raney silver alloy, 70–30, was sprayed on a copper sheet following the foregoing procedure and then leached to provide an electrode suitable for use in fuel cells and particularly for use as an oxygen cathode.

A supported Raney silver electrode for use in a fuel cell was prepared from 45 percent aluminum and 55 percent silver. The aluminum was melted at about 800° C. and silver added as the temperature was raised. The alloy is then raised to 1,100° C. and cast at that temperature into dies heated to 300° C., to form rods three-sixteenth inch in diameter by about 1 foot long. These rods are then utilized in conventional spray flame (hydrogen oxygen) guns and a coating of the alloy is built up on the base material. The coating of the alloy is easily controlled for uniformity and the alloy coating for the desired type cell is in the range of 0.1–0.2 mm. The alloy is then leached with a 5 percent solution of sodium hydroxide at room temperature with the concentration and the temperature being elevated after 24 hours in stages to 80° C. in accordance with the procedure described hereinbefore. When the hydrogen evolution ceases (usually at the end of about 3 days) the aluminum has been leached and the electrode is ready for use. This treatment is somewhat similar to the preparation of catalytic silver and develops a silver structure having defects and, thus, a large exposed surface area. The amount of silver exposed is so large that the resultant silver cathode is pyrophoric. Thus, care must be taken to prevent a reaction with the oxygen in the air.

Self-supporting porous Raney platinum sheets or porous Raney platinum sheets on a substrate, suitable for use as an electrode, are also prepared in accordance with the foregoing procedures.

The Raney metal sheet products of the present invention have a wide variety of uses. The platinum, silver, cobalt and nickel products are useful as electrodes in fuel cells. The silver, nickel and iron products are useful as electrodes in batteries. The cobalt electrodes are believed to be unique in their usefulness in the decomposition of hydrazine. These materials may also be used as catalysts in many organic reactions.

This invention may be variously modified and embodied within the scope of the subjoined claims.

I claim:

1. Sheet material suitable for electrodes comprising a continuous porous layer consisting essentially of highly subdivided particles of Raney silver bonded together to form sheet material capable of being self-supporting, and wherein said Raney silver has been slightly oxidized to render said sheet material nonpyrophoric.

2. A self-supporting porous Raney silver electrode in sheet form according to claim 1, wherein said electrode has a thickness between about 0.5 mm. and 2 mm. and comprising a continuous porous layer consisting essentially of highly subdivided particles of Raney silver bonded together.

3. A composite Raney silver electrode in sheet form according to claim 1, wherein the electrode comprises a substrate coated with between 0.1 mm. and 1.5 mm. of Raney silver, said Raney silver being in the form of a continuous porous layer consisting essentially of highly subdivided particles bonded together to form sheet material capable of being self-supporting.

4. Sheet material suitable for electrodes comprising a continuous porous layer consisting essentially of highly subdivided particles of Raney nickel bonded together to form sheet material capable of being self-supporting, said Raney nickel being slightly oxidized to render said sheet material nonpyrophoric.

5. A self-supporting porous Raney nickel electrode in sheet form according to claim 4 wherein said electrode has a thickness between about 0.5 mm. and 2 mm. and consisting essentially of a continuous porous layer of highly subdivided particles of Raney nickel bonded together.

6. A composite porous Raney nickel electrode in sheet form according to claim 4 wherein said electrode comprises a continuous porous layer consisting essentially of highly subdivided particles of Raney nickel bonded together and bonded to and supported by a porous sheet nickel substrate.

7. A composite Raney nickel electrode in sheet form according to claim 4 wherein said electrode comprises a substrate coated with between 0.1 mm. and 1.5 mm. of Raney nickel, said Raney nickel being in the form of a continuous porous layer consisting essentially of highly subdivided particles bonded together.

8. The composite electrode of claim 7 wherein said substrate is nickel foil.

9. A composite Raney nickel electrode in sheet form according to claim 4 wherein said electrode comprises a nickel foil substrate coated on both surfaces with between 0.1 mm. and 1.5 mm. of Raney nickel, said Raney nickel being in the form of a continuous porous layer consisting essentially of highly subdivided particles bonded together.

10. Sheet material suitable for electrodes comprising a continuous porous layer consisting essentially of highly subdivided particles of Raney cobalt bonded together to form a sheet material capable of being self-supporting, said Raney Cobalt being slightly oxidized to render said sheet material nonpyrophoric.

* * * * *